United States Patent
Shikata et al.

(10) Patent No.: US 8,731,376 B2
(45) Date of Patent: May 20, 2014

(54) RECORDER CONTROL APPARATUS AND CONTROL METHOD

(75) Inventors: Yasushi Shikata, Tama (JP); Katsuhiro Miyamoto, Isehara (JP); Tomoyasu Yoshikawa, Kawasaki (JP); Teruki Kikkawa, Machida (JP); Satoshi Hanamitsu, Kawasaki (JP); Tomoya Asanuma, Yokohama (JP); Osamu Yonishi, Yokohama (JP); Koji Mito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 977 days.

(21) Appl. No.: 12/048,164

(22) Filed: Mar. 13, 2008

(65) Prior Publication Data

US 2008/0226258 A1  Sep. 18, 2008

(30) Foreign Application Priority Data

Mar. 14, 2007  (JP) ................. 2007-065781

(51) Int. Cl.
*H04N 5/76* (2006.01)

(52) U.S. Cl.
USPC ........................................................ 386/293

(58) Field of Classification Search
USPC ................................... 386/83, 293
See application file for complete search history.

(56) References Cited

U.S. PATENT DOCUMENTS

| | | | | |
|---|---|---|---|---|
| 5,155,845 | A | * | 10/1992 | Beal et al. ........................ 714/6.12 |
| 5,963,264 | A | * | 10/1999 | Jackson ........................ 348/460 |
| 6,549,715 | B1 | * | 4/2003 | Sasaki ........................ 386/230 |
| 2004/0015992 | A1 | * | 1/2004 | Hasegawa et al. ............. 725/86 |
| 2004/0047616 | A1 | * | 3/2004 | Uchiumi et al. ............. 386/111 |
| 2005/0198185 | A1 | * | 9/2005 | Yamaoka et al. ............. 709/208 |

FOREIGN PATENT DOCUMENTS

| | | |
|---|---|---|
| JP | 2001-339696 A | 12/2001 |
| JP | 2002318364 A | 8/2002 |
| JP | 2006-054022 A | 2/2006 |

OTHER PUBLICATIONS

Japanese Office Action for Appln. No. 2007-065781 dated Sep. 16, 2011.

* cited by examiner

*Primary Examiner* — Hadi Armouche
*Assistant Examiner* — Dao Ho
(74) *Attorney, Agent, or Firm* — Carter, DeLuca, Farrell & Schmidt LLP

(57) ABSTRACT

A recorder control apparatus which controls execution of broadcast program recording in a plurality of recorders connected thereto, comprises an acceptance unit configured to accept a request to execute broadcast program recording, an acquisition unit configured to acquire, from each recorder, reservation information related to reserved program recording to be executed by the recorder after a point at which the execution request is accepted, a selection unit configured to select, from the plurality of recorders, a recorder capable of executing broadcast program recording corresponding to the execution request for a longest duration, based on the reservation information, and a request unit configured to request the recorder selected by the selection unit to execute broadcast program recording corresponding to the execution request.

7 Claims, 12 Drawing Sheets

F I G. 1
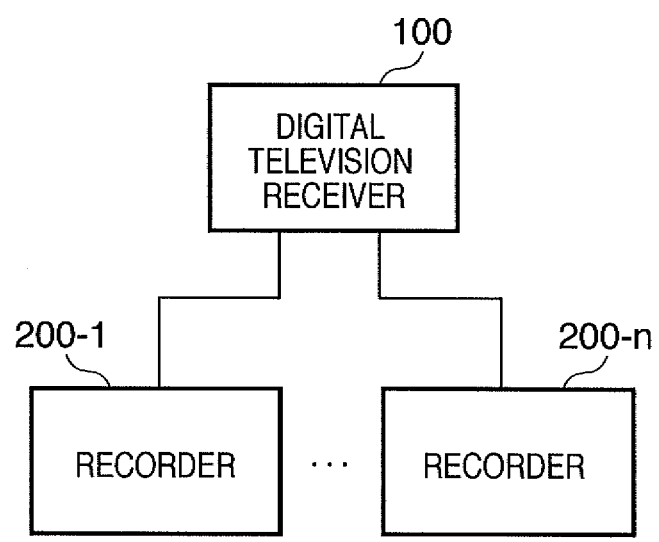

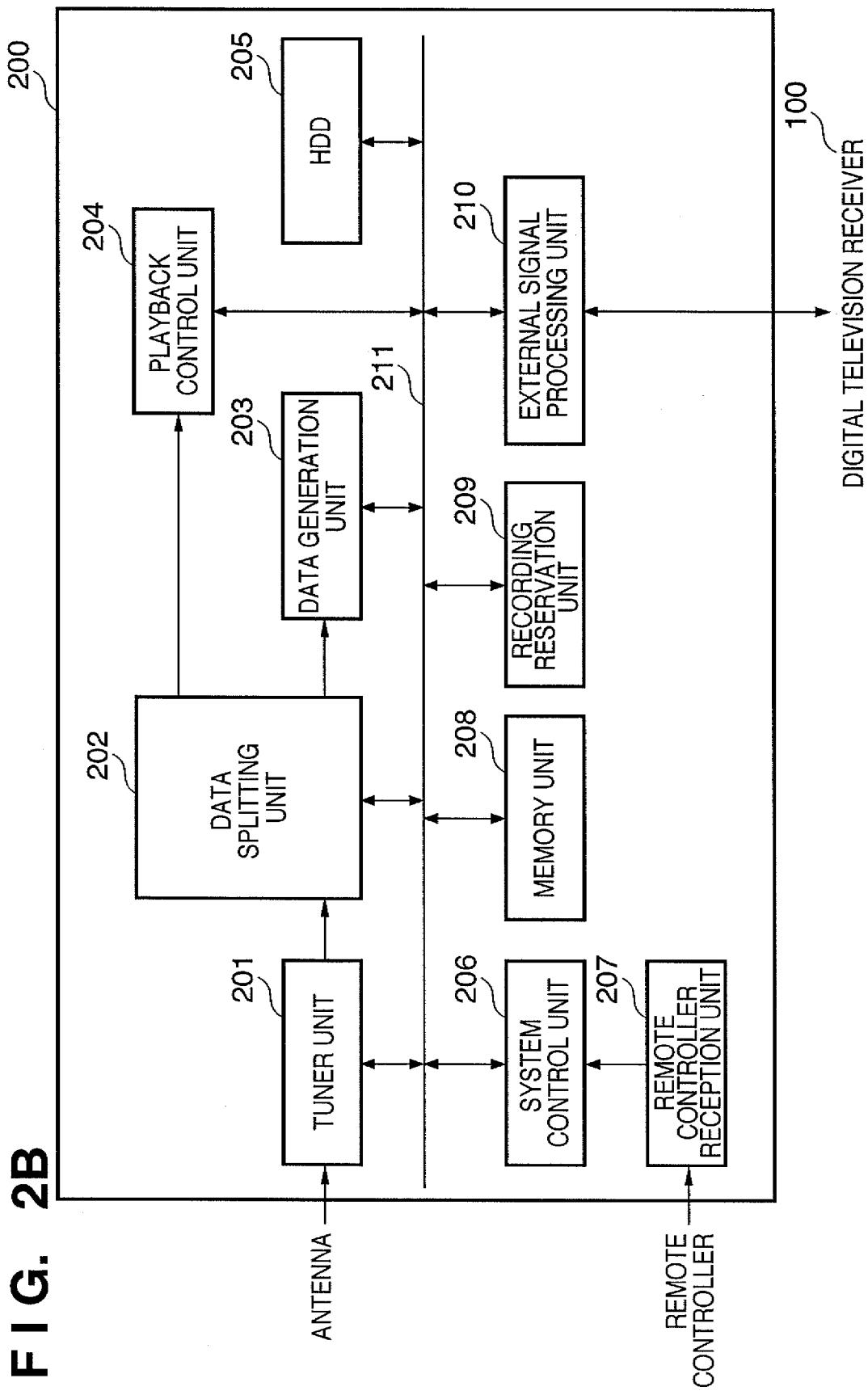

F I G. 5
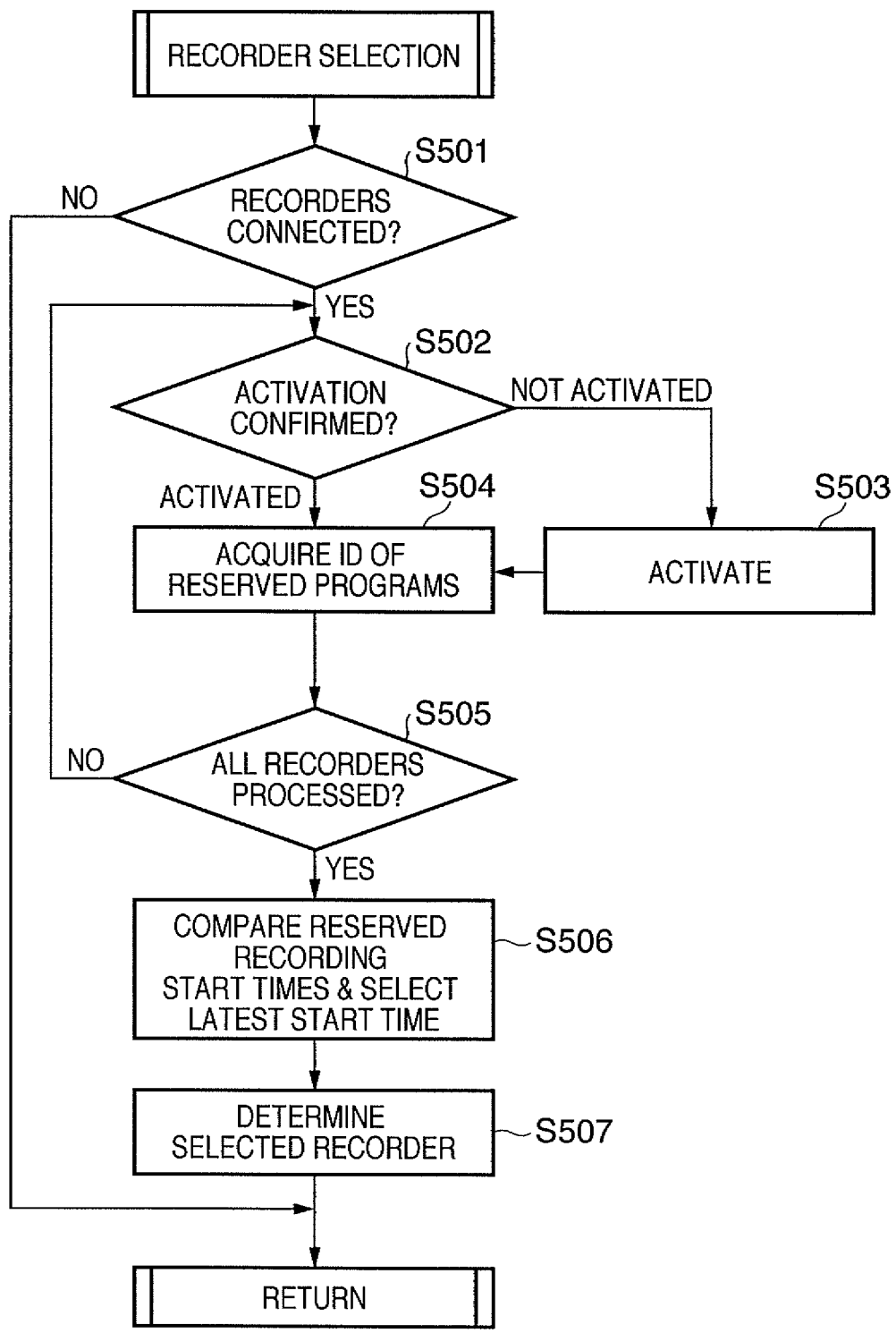

FIG. 7

| BROADCAST TYPE | | COMPATIBILITY |
|---|---|---|
| TERRESTRIAL DIGITAL BROADCAST | TERRESTRIAL DIGITAL BROADCAST | NO |
| TERRESTRIAL DIGITAL BROADCAST | TERRESTRIAL ANALOG BROADCAST | YES |
| TERRESTRIAL DIGITAL BROADCAST | BS DIGITAL BROADCAST | NO |
| TERRESTRIAL DIGITAL BROADCAST | CS DIGITAL BROADCAST | NO |
| . . . | . . . | . . . |

RECORDER CONTROL APPARATUS AND CONTROL METHOD

BACKGROUND OF THE INVENTION

1. Field of the Invention

The present invention relates to a recorder control apparatus (television receiver) that controls one or more recorders.

2. Description of the Related Art

There exist methods of immediately recording a program that is being broadcast (hereinafter, to be referred to as "immediate recording"). Immediate recording is often used when the user is temporarily called away while watching a program, for instance. Consequently, being able to perform one-touch recording on an external recorder or built-in recorder using the television receiver's remote controller (or an equally simple method) is convenient and desirable. In fact, there exist systems composed of a television receiver and a recorder that realize such a one-touch immediate recording method.

There are systems in which the television receiver and the recorder are connected with an HDMI cable, and transmission and reception of device attribute information and control signals is realized using DDC and CEC. Note that HDMI stands for High Definition Multimedia Interface, DDC stands for Display Data Channel, and CEC stands for Consumer Electronics Control. With such systems, the television receiver activates the connected recorder when the user instructs immediate recording using the television receiver's remote controller, enabling the content of a broadcast program or the like to be recorded.

There are methods of immediate recording where a recording period is designated in minute units or program units and recording is performed for the designated period, and methods where recording is performed without providing a period. The former method may result in a portion of program content not being recorded (hereinafter, referred to as "unrecorded content"), since recording stops when the designated period elapses. The latter method is superior to the former method in terms of reducing unrecorded content.

In recent years, more high-definition programs are being produced and television screens are increasing in size, leading to an increase the amount of recording done at a high data rate. Given this situation, immediate recording may be forcibly terminated due to restrictions such as insufficient storage capacity in the recorder, giving rise again to the possibility of unrecorded content existing even cases where a recording period is not designated.

Television receivers provided with a plurality of HDMI terminals are now appearing, making it likely that we will see more cases of television receivers with a plurality of recorders connected thereto in the future. This system allows the occurrence of unrecorded content due to insufficient storage capacity to be eliminated, depending on the recording destination selected when performing immediate recording. That is, the possibility of unrecorded content arising can be reduced by being able to appropriately select a recorder capable of recording for the longest period from the plurality of connected recorders.

Japanese Patent Laid-Open No. 2006-54022 and Japanese Patent Laid-Open No. 2001-339696 are given as examples of conventional technology that relates to this. Japanese Patent Laid-Open No. 2006-54022 proposes a method in a system constituted by a plurality of recorders and a television receiver, whereby a recorder to perform reserved recording is selected based on priorities set for the recorders by the user and state information acquired from each recorder. Note that state information refers to information such as whether or not recording is currently being performed, whether or not a storage medium is attached thereto, and the storage capacity of the storage medium. Japanese Patent Laid-Open No. 2001-339696 proposes a recording method in a system constituted by a plurality of recorders and a television receiver, whereby the program is divided and then recorded in the case where none of the recorders are capable of independently recording the desired program.

However, these proposed recording methods assume reserved recording with a definite recording period, and do not take into consideration an optimal recording method for immediate recording performed without providing a recording period.

SUMMARY OF THE INVENTION

In view of this, an aspect of the present invention is to provide a technique that makes the occurrence of unrecorded content preventable, even in the case where immediate recording is performed without providing a recording period, in a system constituted by a plurality of recorders and a television receiver.

One aspect of the present invention relates to a recorder control apparatus which controls execution of broadcast program recording in a plurality of recorders connected thereto, comprising an acceptance unit configured to accept a request to execute broadcast program recording, an acquisition unit configured to acquire, from each recorder, reservation information related to reserved program recording to be executed by the recorder after a point at which the execution request is accepted, a selection unit configured to select from the plurality of recorders, based on the reservation information, a recorder capable of executing broadcast program recording corresponding to the execution request for a longest duration, and a request unit configured to request the recorder selected by the selection unit to execute broadcast program recording corresponding to the execution request.

Another aspect of the present invention relates to control method of a recorder control apparatus which controls execution of broadcast program recording in a plurality of recorders connected thereto, the method comprising accepting a request to execute broadcast program recording, acquiring, from each recorder, reservation information related to reserved program recording to be executed by the recorder after a point at which the execution request is accepted, selecting, from the plurality of recorders, a recorder capable of executing broadcast program recording corresponding to the execution request for a longest duration, based on the reservation information, and requesting the selected recorder to execute broadcast program recording corresponding to the execution request.

Further features of the present invention will become apparent from the following description of exemplary embodiments (with reference to the attached drawings).

BRIEF DESCRIPTION OF THE DRAWINGS

FIG. 1 shows an exemplary configuration of a recorder control system corresponding to various embodiments of the invention.

FIG. 2B shows an exemplary hardware configuration of a recorder 200 corresponding to various embodiments of the invention.

FIG. 5 is a flowchart showing exemplary detailed content of a recorder selection process corresponding to a first embodiment of the invention.

FIG. 7 shows exemplary combination information on parallel recordable broadcast types corresponding to the second embodiment of the invention.

DESCRIPTION OF THE EMBODIMENTS

Figure 2A:
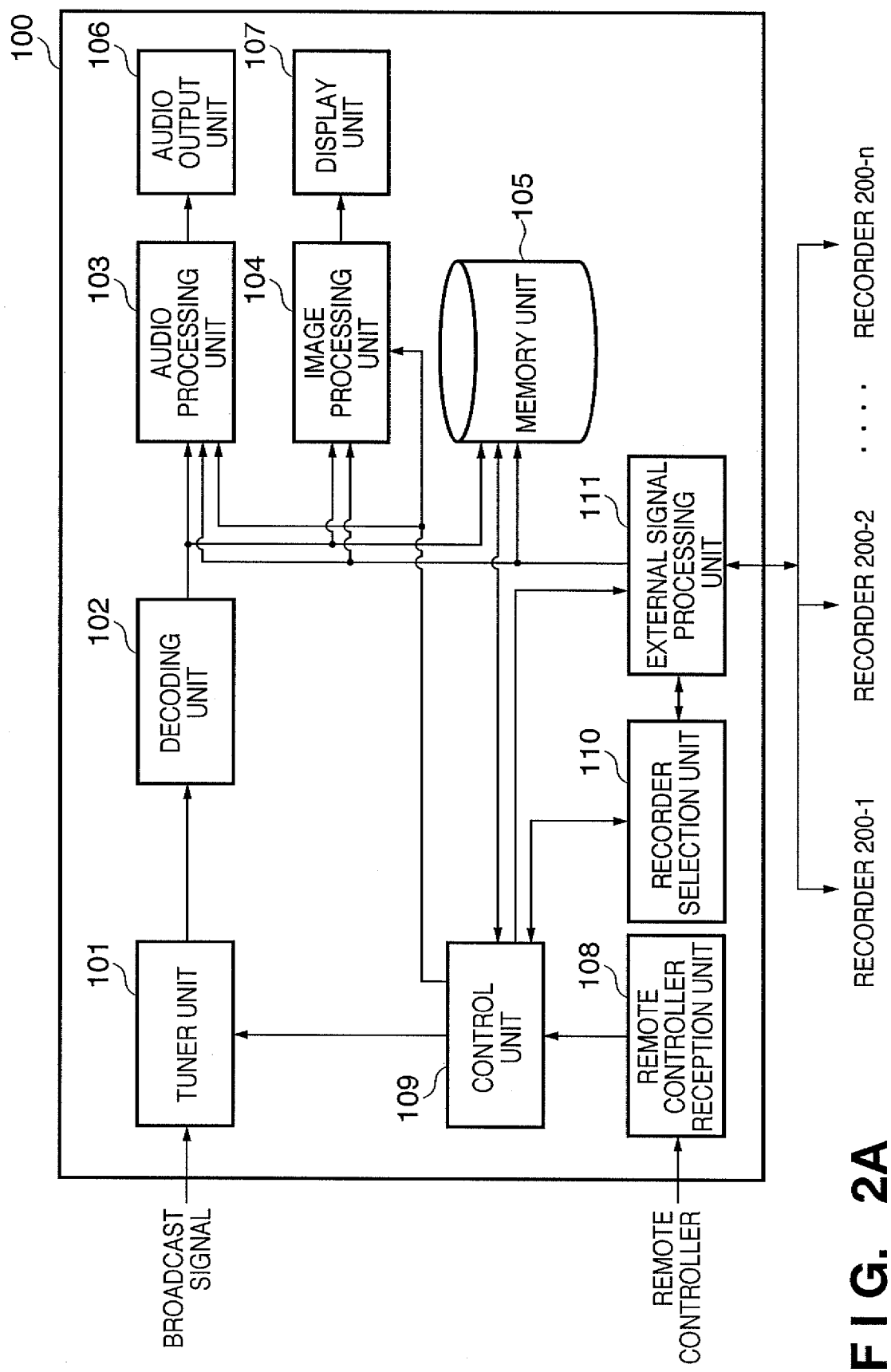
FIG. 2A shows an exemplary hardware configuration of a digital television receiver 100 corresponding to various embodiments of the invention.

Hereinafter, various embodiments of the invention will be described with reference to the accompanying drawings. A recorder control apparatus in the embodiments of the invention is connected to a plurality of recorders and controls execution of broadcast program recording in the plurality of recorders, and is applicable to a receiver compatible with digital broadcasts. A digital television receiver and personal computer are given as examples of such an apparatus.

First Embodiment

Various embodiments of the present invention will be now be described in detail, with a digital television receiver given as an exemplary recorder control apparatus.

FIG. 1 shows an exemplary configuration of a recorder control system corresponding to various embodiments of the present invention. A digital television receiver 100 is connected to a plurality of recorders (200-1 to 200-n) using HDMI cables. The present embodiment is described using a system configuration in which n recorders are connected. Note that in the following description the n recorders are referred to collectively as recorders 200 for simplicity.

In FIG. 1, a relationship between the digital television receiver 100 and the recorders 200 in terms of video/audio transmission is such that the digital television receiver 100 is frequently on the reception side and the recorders 200 are frequently on the transmission side, for example. The recorders 200 decompress moving image/audio data such as recorded broadcast programs in accordance with the output resolution of the digital television receiver 100, and send the resultant data to the digital television receiver 100. On the other hand, attribute information and control information transmitted with the DDC and CEC lines in the HDMI cable can be transmitted bi-directionally.

Information transmitted with the DDC line includes information related to the video format, for example. Specifically, information related to output resolution, interlaced/progressive, frame rate, aspect ratio, and the like. This information is transmitted from the digital television receiver 100 to the recorders 200 when a cable connection is established, for example.

Information transmitted with the CEC line includes control information for activation control, recording start control, and the like. The CEC line is provided with extensibility so as to enable unique control information to be defined per header. With the CEC line, it is therefore also possible to transmit header specific control information and other types of information. In the present embodiment, the digital television receiver 100 is able to acquire storage capacity information of DVD media and the built-in hard disk drive (hereinafter, collectively "HDD") of the recorders 200 using the CEC line. Channel information (service information) and combination information on the parallel recordable broadcast types (described below) can also be acquired using the CEC line.

Immediate recording in the present embodiment is realized by the digital television receiver 100 transmitting control information for recording start, recording stop, or the like to the recorders 200 via this CEC line. Immediate recording in the present embodiment is therefore executed independently by the digital television receiver 100. Each recorder 200 performs reception with a built-in tuner and records broadcast programs to the HDD managed individually.

Note that immediate recording is not limited to the embodiment using the built-in tuner of the recorders 200. Immediate recording may be performed by transferring transport stream data (described below) generated from a digital broadcast signal received by a tuner built into the digital television receiver 100 to the recorders 200.

Next, the hardware configuration of the digital television receiver 100 corresponding to the present embodiment will be described with reference to FIG. 2A. FIG. 2A is a block diagram showing a schematic configuration of the digital television receiver 100. The digital television receiver 100 is provided with a tuner unit 101, a decoding unit 102, an audio processing unit 103, an image processing unit 104, a memory unit 105, an audio output unit 106, a display unit 107, a remote controller reception unit 108, a control unit 109, a recorder selection unit 110, and an external signal processing unit 111.

The tuner unit 101 switches between broadcast types such as broadcast satellite (BS), communication satellite (CS) and terrestrial digital broadcasts in response to a channel selection request from the control unit 109, and selects a corresponding tuner from the internal reception tuners. Next, the tuner unit 101 receives a digital broadcast signal via an antenna (not shown), and demodulates the received digital broadcast signal. The tuner unit 101 then regenerates data composed of multiplexed video, audio and the like (transport stream data), and outputs the transport stream data to the decoding unit 102.

The decoding unit 102 splits the transport stream data provided by the tuner unit 101 into video data, audio data, PSI/SI data and the like, and decodes the respective data. Note that PSI/SI stands for Program Specific Information/Service Information. The result of this decoding is output to the image processing unit 104 in the case of video data, and to the audio processing unit 103 in the case of audio data. Program information included in the PSI/SI data is output to the memory unit 105, which is a nonvolatile or volatile memory, and is held temporarily. This program information includes program title, program content description, broadcast type, channel, broadcast time information, start time, duration and program category, with information such as broadcast type and channel being used when immediate recording is performed.

The audio processing unit 103 performs sound quality, realistic sensation, and other audio processing on audio data output from the decoding unit 102, and outputs the resultant data to the audio output unit 106 (speaker) after performing D/A conversion and amplification.

The image processing unit 104 combines/switches video data decoded by the decoding unit 102 and the image data of a graphical user interface (GUI) or the like. The image processing unit 104 also performs denoising, decompression, gradation, edge enhancement and other image processing on data before and after the combining/switching. The data combined by the image processing unit 104 is displayed by the display unit 107 as a result of the image processing unit functioning as a display control unit. The display unit 107 may be an external monitor.

The memory unit 105 is a nonvolatile or volatile memory mainly used to save the input state, channel selection, program information, channel selection table, and information relating to the recorder 200 (storage capacity information, state information such as whether or not the recorder is activated).

The remote controller reception unit 108 receives a remote controller code output from the remote controller in response to a button operation by the user, and transfers the received remote controller code to the control unit 109.

The control unit 109 performs control according to the remote controller code received from the remote controller reception unit 108. Controls relate to channel selection, input switching and recording. For example, if judged to be channel selection based on the received remote controller code, the control unit 109 acquires the current channel selection and a table held in the memory unit 105 that associates remote controller keys (remote controller codes) with channels. The control unit 109 then specifies the next channel to be selected, and outputs a channel selection request to the tuner unit 101.

If the received remote controller code relates to execution of input switching, the control unit 109 acquires information held in the memory unit 105 regarding the input state. The image processing unit 104 and the audio processing unit 103 are then notified of the input destination to be switched to next. For example, consider the case where information on the input state shows that a broadcast signal input from the tuner unit 101 is being displayed, and the switching destination is an input from a specific external terminal managed by the external signal processing unit 111. In this case, the control unit 109 notifies the image processing unit 104 and the audio processing unit 103 to switch the input destination from the tuner unit 101 to the external signal processing unit 111. The image processing unit 104 and the audio processing unit 103 switch the input signal to be processed in accordance with the notification.

If the received remote controller code relates to the execution of immediate recording, the control unit 109 requests the recorder selection unit 110 to select a recorder to perform immediate recording. The recorder selection unit 110 requests a recorder selected from among the n recorders 200 (selected recorder) to execute recording. The recording request to the selected recorder is made via the external signal processing unit 111. At this time, information on the broadcast program (channel) currently selected (broadcast type, channel information (service information)), which is held in the memory unit 105, is transmitted to and set in the selected recorder.

The control unit 109 updates the current channel selection and the current input state held in the memory unit 105 each time control for channel selection, input switching, or the like is performed. The recorder selection unit 110 selects a recorder to execute recording from the plurality of externally connected recorders 200-1 to 200-n, triggered by the request from the control unit 109. At this time, the recorder selection unit 110 acquires storage capacity information and information on recording reservations from each of the connected recorders 200 via the external signal processing unit 111. The recorder selection unit 110 then determines the selected recorder based on the acquired information.

The external signal processing unit 111 is an interface (I/F) with the connected recorders 200-1 to 200-n. In the present embodiment, the external signal processing unit 111 controls input/output of signals via HDMI terminals. The plurality of recorders 200 are each connected by a different terminal, and when an input signal corresponding to one of the recorders is supplied from a corresponding terminal, the external signal processing unit 111 performs control to switch to that recorder.

The external signal processing unit 111 also filters the input signal, and transmits the input signal to the appropriate corresponding block according to the data type. For example, video data is transmitted to the image processing unit 104, while audio data is transmitted to the audio processing unit 103. The storage capacity information, recording reservation information, and activation and other state information of the recorders 200 is transmitted to the recorder selection unit 110 and the memory unit 105.

Next, the hardware configuration of the recorders 200 corresponding to the present embodiment will be described with reference to FIG. 2B. FIG. 2B is a block diagram showing a schematic configuration of the recorders 200. The recorders 200 are each provided with a tuner unit 201, a data splitting unit 202, a data generation unit 203, a playback control unit 204, an HDD 205, a system control unit 206, a remote controller reception unit 207, a memory unit 208, a recording reservation unit 209, an external signal processing unit 210, and a bus 211.

Firstly, the tuner unit 201 performs demodulation, error correction, and other processing on the input broadcast signal, and forms a transport stream. The data splitting unit 202 splits the transport stream data into video, audio, program information, and current time information related to the desired channel, and outputs the respective data to the data generation unit 203 and the playback control unit 204.

The data generation unit 203 generates stream data for storage on the HDD 205, based on the video, audio, and program information output from the data splitting unit 202.

The playback control unit 204, in the case of playing a recorded program, acquires the stream data of the program stored on the HDD 205, decodes the video and audio data, and outputs the processing result to the digital television receiver 100 via the external signal processing unit 210. The playback control unit 204 also stores history information of when playback was performed in the memory unit 208. The HDD 205 is constituted by a built-in hard disk drive and DVD media, and stores the data of recorded programs and the like.

The system control unit 206 controls the overall operations of the recorder 200. The system control unit 206 performs control according to a remote controller code received from the remote controller reception unit 207. Controls relate to channel selection, input switching, and recording. The system control unit 206 also detects the remaining storage capacity of the HDD 205, and stores the detected remaining storage capacity in the memory unit 208. Note that the remaining storage capacity in the present embodiment refers to the storage capacity of the entire storage area of the HDD 205 remaining after the area currently being used for data storage is excluded. For example, if the storage capacity of the entire storage area is 400 GB and 240 GB of that is currently being used for data storage, the remaining storage capacity will be 160 GB.

The remote controller reception unit 207 receives the remote controller code output from the remote controller in response to a button operation by the user, and transfers the received remote controller code to the system control unit 206.

The memory unit 208 stores set recording reservation information, recording history information associated with recording execution, playback history information associated with playback execution, and information on the remaining storage capacity of the HDD 205. The memory unit 208 also stores combination information on parallel recordable broadcast types which will be described in the second embodiment.

The recording reservation unit 209 periodically acquires recording reservation information stored in the memory unit 208, and judges whether the start time of reserved programs registered in the recording reservation information has arrived. If the start time has arrived, the recording reservation unit 209 requests the system control unit 206 to start recording on the channel registered in the recording reservation information.

The external signal processing unit 210 is an interface (I/F) with the connected digital television receiver 100. In the present embodiment, the external signal processing unit 210 controls input/output of signals via an HDMI terminal. The bus 211 interconnects the above blocks.

Figure 3:
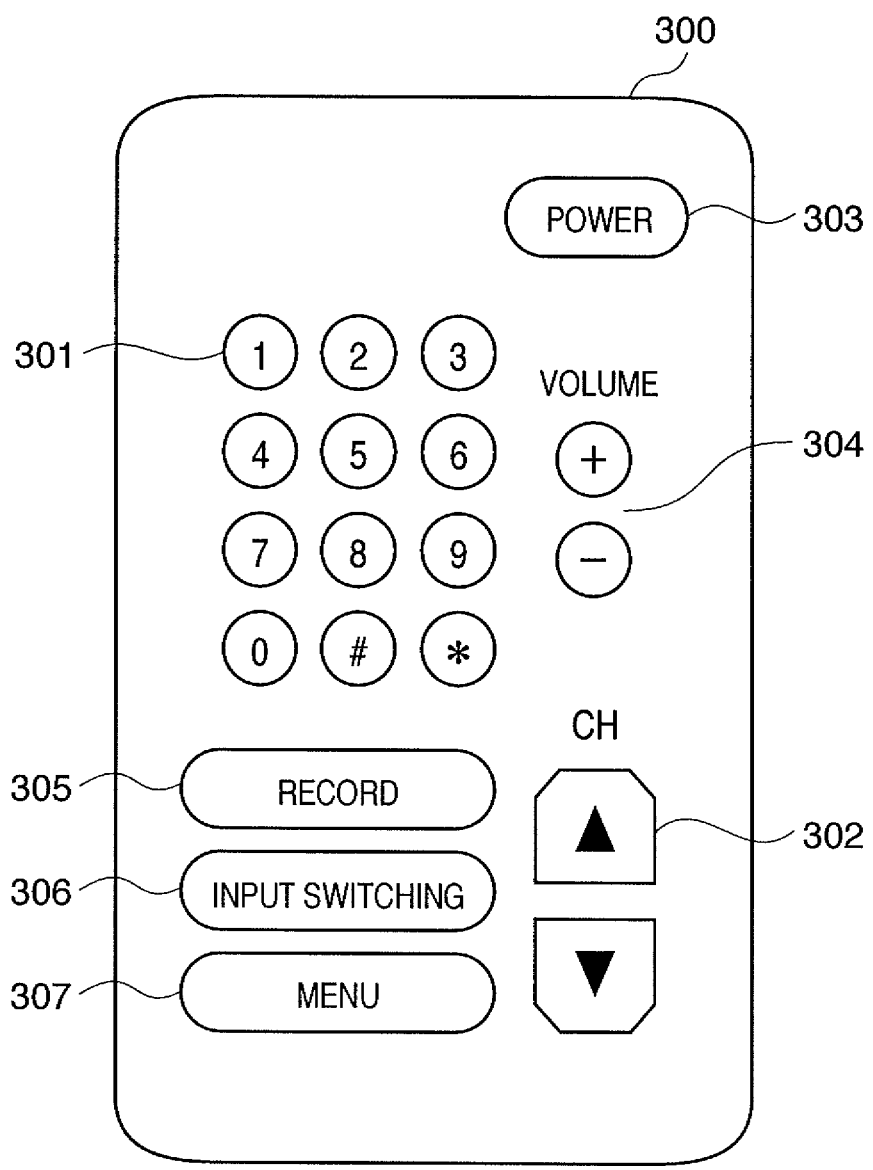
FIG. 3 shows an exemplary external view of a remote controller 300 corresponding to various embodiments of the invention.

Next, the configuration of a remote controller corresponding to the present embodiment will be described with reference to FIG. 3. FIG. 3 shows an exemplary configuration of the remote control keys of a remote controller 300 according to the embodiments of the invention.

The remote controller 300 is provided with numeric keys 301, channel selection up/down keys 302, a power key 303, volume control up/down keys 304, an input switching key 306, and a record key 305 for immediate recording. In addition, the remote controller 300 may also have a menu key 307 for displaying the GUI windows of menus and the like. Immediate recording in the present embodiment is triggered by the record key 305 being depressed. A configuration is also possible, however, in which a menu window is displayed by first pressing the menu key 307, and immediate recording is executed by selecting one of the display items using the numeric keys 301 or the like.

Figure 4:
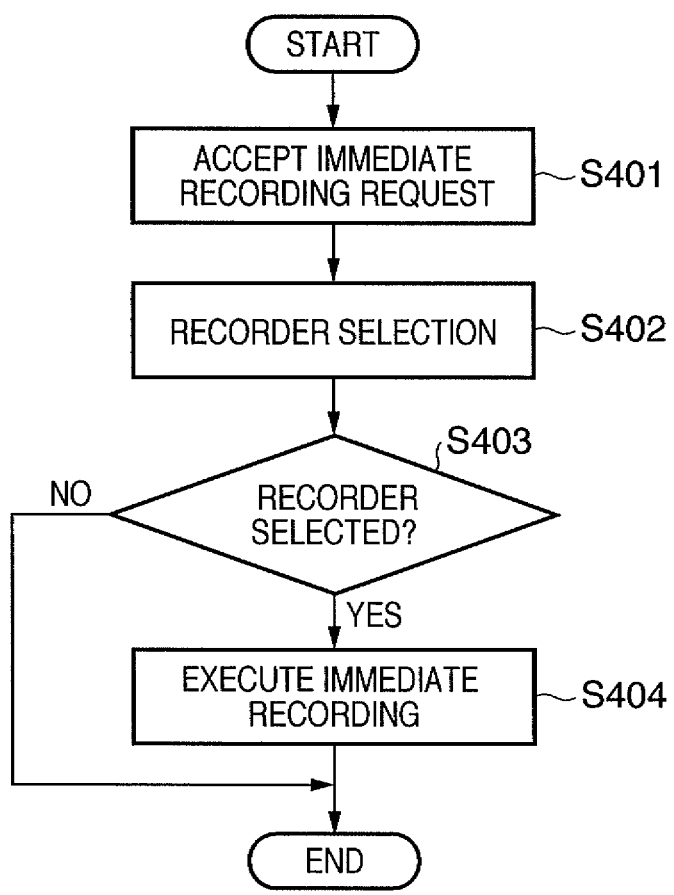
FIG. 4 is a flowchart showing an exemplary immediate recording process corresponding to various embodiments of the invention.

Next, the immediate recording process corresponding to the present embodiment will be described with reference to FIG. 4. FIG. 4 is a flowchart showing an exemplary immediate recording process according to the present embodiment. Note that processing in accordance with the flowchart shown in FIG. 4 is realized as a result of corresponding processing programs being executed by the blocks under the control of the control unit 109.

In FIG. 4, in step S401, an immediate recording request is accepted from the user. Specifically, a request is accepted as a result of the remote controller code transmitted from the remote controller 300 in response to the user depressing the record key 305 being received by the remote controller reception unit 108 and transferred to the control unit 109.

Next, in step S402, the control unit 109 determines it to be immediate recording based on the remote controller code, and executes a recorder selection process in order to determine the selected recorder for executing the immediate recording. This recorder selection process will be described in detail below with reference to FIG. 5.

In step S403, the control unit 109 determines whether the selected recorder could be determined as result of the recorder selection process. If the selected recorder could not be determined due to no recorders being connected or due to all of the recorders being already engaged in recording (step S403: NO), the current processing is ended.

On the other hand, if the selected recorder was determined (step S403:YES), the processing moves to step S404. In step S404, the control unit 109 causes immediate recording to be performed by requesting, via the external signal processing unit 111, that the recorder that equates to the selected recorder to execute recording. This request can be made to the selected recorder using the CEC line. At this time, the control unit 109 acquires information on the channel for recording currently being viewed (e.g., broadcast type, service ID, etc), and notifies the acquired information to the recorder 200 together with the immediate recording request. In the present embodiment, immediate recording is performed with the transport stream mode.

Next, the recorder selection process of FIG. 4 will be described in detail with reference to FIG. 5. FIG. 5 is a flowchart showing an exemplary detailed content of the recorder selection process. This processing is executed by the recorder selection unit 110 in response to a request from the control unit 109 to determine the selected recorder.

The recorder selection unit 110, in step S501, confirms whether any recorders 200 are connected to the digital television receiver 100. If one or more recorders 200 are connected (step S501:YES), the processing moves to step S502. On the other hand, if no recorders 200 are connected (step S501:NO), the processing is directly ended. In this case, the selected recorder is not determined.

In step S502, the activation state of the connected recorders 200 is confirmed. Device specific identification information (device ID) is allocated to those recorders that are confirmed as being activated (step S502: activated), before moving to step S504. If any recorders 200 are not activated (step S502: not activated), an activation process is performed externally on those recorders in step S503, and once activation has been confirmed, a device ID is allocated and the processing moves to step S504.

In step S504, the reservation information (reservation ID) of reserved program recording to be executed closest to the present time (Ti_1) is acquired from each of the recorders 200-1 to 200-n via the external signal processing unit 111. The reservation IDs acquired here include, for example, the broadcast type of the program, the channel number (service ID), the program title, and the program start time. Note that the reservation IDs of any recorders 200 that are performing reserved program recording at that point will include information showing that recording is currently being performed or the start time of the program currently being recorded.

The broadcast type is an ID for identifying whether the broadcast is a terrestrial digital broadcast, BS digital broadcast, or the like. Service IDs are IDs allocated for every service in an event information table (EIT), which is one type of service information (SI). The acquired reservation IDs are held in the memory unit 105 as table information in association with device IDs.

In step S505, it is determined whether the processing from step S502 to step S504 has been performed for all of the n recorders 200. If there are unprocessed recorders (step S505: NO), the processing returns to step S502 and is continued. On the other hand, if all of the recorders have been processed (step S505: YES), the processing moves to step S506.

Ti_S1 to Ti_Sn are obtained, based on the reservation IDs, as the start time information of broadcast programs P1 to Pn for which reserved program recording is to be executed in the recorders 200-1 to 200-n at times closest to the present time Ti_1, which corresponds to the point at which the immediate recording request was accepted. Note that if no reservations have been made, a predetermined value indicating "no reservations" may be set instead of a time.

In step S506, the start time information Ti_S1 to Ti_Sn of the recorders 200-1 to 200-n is compared, and the latest start time is selected from Ti_S1 to Ti_Sn. If the value indicating "no reservations" is set for any of the start time information, the start time information having the "no reservations" value may be selected instead.

In the following step S507, the recorder corresponding to the start time selected in step S506 is determined as the selected recorder, and the control unit 109 is notified. For example, if Ti_S1 is selected, the recorder selection unit 110 is able to specify the recorder 200-1 corresponding to this start time, based on the table information stored in the memory unit 105. In this case, since the recorder 200-1 is specified, the recorder 200-1 is determined as the selected recorder.

If, however, the latest start time selected in step S506 is prior to the present time Ti_1, that is, if all of the recorders 200 are recording at the present point in time, the selected recorder is not determined in step S507.

According to the present embodiment, the start times of reserved program recording to be executed by the recorders after the point at which a request to execute immediate recording is accepted can be specified in advance, when performing immediate recording in the recorder control system. This enables the recorder capable of recording for the longest to be specified when executing immediate recording, making it possible to reduce the possibility of unrecorded content arising.

Note that in the present embodiment, a system in which the digital television receiver 100 and the recorders 200 are connected with HDMI cables was described. However, the mode of connection is not limited to an HDMI cable. The present invention may be implemented with a mode of connection having a similar function to HDMI, such as IEEE1394. Also, plural modes of connection may be mixed, such that certain recorders are connected using an HDMI cable, while other recorders are connected using an IEEE1394 cable.

Note that with the processing of step S504 in FIG. 5, the reservation IDs that the recorder selection unit 110 acquires from each of the recorders 200 are described as including the start time information of reserved program recording. However, start time information does not necessarily have to be included in the reservation IDs. For example, the recorder selection unit 110 may acquire the program start times of reserved programs from the program information stored in the memory unit 105 using other information included in the reservation IDs.

Also, if the broadcast program related to reserved program recording in a recorder that is closest to the present time is the same broadcast type and the same channel (same service) as the broadcast program for immediate recording, the reserved program recording can be executed as part of the immediate recording. Therefore, in this case, the recorder selection unit 110, in step S504, acquires information related to subsequent reserved program recording to be executed for a program whose broadcast type or channel is different.

Second Embodiment

In the foregoing first embodiment, the case was described where the recorder with the latest time for executing reserved program recording is selected to perform immediate recording. In contrast, the second embodiment is characterized in that the recorder capable of recording for the longest is determined as the selected recorder, with consideration given to the remaining storage capacity of the recorders 200.

The schematic configurations of the digital television receiver 100 and the recorders 200, and the configuration of the remote controller according to the present embodiment can be the same as (or alternatively similar to) the first embodiment. The overview of the immediate recording process according to the present embodiment can be implemented in the manner described in the first embodiment as illustrated in FIG. 4 except for the following differences.

Figure 6:
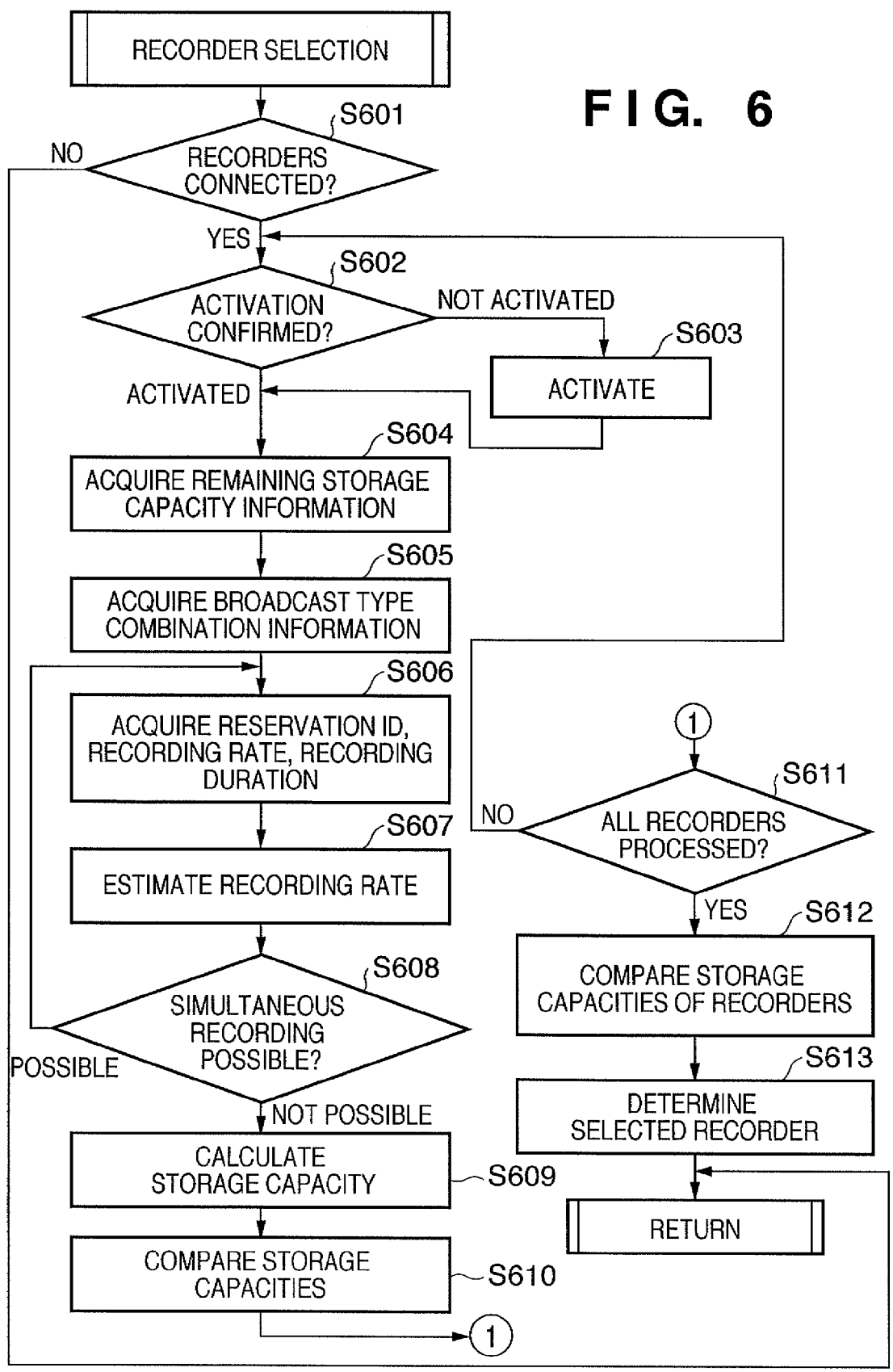
FIG. 6 is a flowchart showing exemplary detailed content of a recorder selection process corresponding to a second embodiment of the invention.

The recorder selection process of step S402 in FIG. 4 executed in accordance with the present embodiment is next described in detail. FIG. 6 is a flowchart showing an exemplary detailed content of this recorder selection process. This processing is executed by the recorder selection unit 110 in response to a request from the control unit 109 to determine the selected recorder.

The recorder selection unit 110, in step S601, confirms whether any recorders 200 are connected to the digital television receiver 100. If one or more recorders 200 are connected (step S601: YES), the processing moves to step S602. On the other hand, if no recorders 200 are connected (step S601: NO), the processing is directly ended. In this case, the selected recorder is not determined.

Next, in step S602, the activation state of the connected recorders 200 is confirmed. Device specific identification information (device ID) is allocated to those recorders that are confirmed as being activated (step S602: activated) before moving to step S604. If any recorders 200 are not activated (step S602: not activated), an activation process is performed externally on those recorders in step S603, and once activation has been confirmed, a device ID is allocated and the processing moves to step S604.

Next, in step S604, remaining storage capacity information of the HDD 205 is acquired from each recorder 200 via the external signal processing unit 111.

Next, in step S605, the recorder selection unit 110 acquires combination information on parallel recordable broadcast types from each recorder 200. FIG. 7 illustrates exemplary combination information on parallel recordable broadcast types. As shown in FIG. 7, this broadcast type combination information indicates whether or not parallel recording can be performed, depending on the combination of broadcast types. For example, it can be seen that in the case where two broadcast programs to be recorded at the same time are both terrestrial digital broadcasts, only one of the programs can be recorded, whereas both programs can be recorded with the combination of terrestrial digital and terrestrial analog broadcasts.

Note that FIG. 7 shows the case where each recorder is mounted with one digital broadcast tuner and one analog broadcast tuner as an example. The combination information naturally differs depending on the type and number of mounted tuners.

In the following step, S606, the reservation information (reservation ID) of reserved program recording to be executed closest to the present time (Ti_1), the recording rate, and the recording duration of the program are acquired from each of the recorders 200-1 to 200-n via the external signal processing unit 111. The content of the reservation IDs is similar to the first embodiment.

Next, in step S607, the recorder selection unit 110 accesses the memory unit 105 to acquire video format information on the channel currently being viewed, and estimates the recording rate from this information. Note that in the present embodiment, immediate recording is performed with the transport stream mode. In step S607, the recording rate if recording were performed with the transport stream mode is also estimated for the reserved programs in the recorders. This estimation is performed by the recorder selection unit 110 based on the video format information on reserved programs acquired from the memory unit 105 and based on the reservation IDs acquired from the recorders. Program information for a prescribed period is prestored in the memory unit 105, and information on the video format can be extracted from this program information.

Note that in the case where immediate recording or reserved program recording is not performed in the transport stream mode, step S607 can be omitted. In that case, immediate recording is performed using a preset recording rate. The recording rate acquired in S606 is used for reserved program recording in the recorders 200.

In the following step, S608, the recorder selection unit 110 determines whether the program for immediate recording and the next reserved program can be recorded in parallel. The determination here is performed using the broadcast type combination information acquired in step S605. If the broadcast types differ, there will be recorders 200 capable of parallel recording a plurality of programs. Even if the broadcast type is the same, recorders mounted with a plurality of tuners will be able to record in parallel a plurality of programs with the same broadcast type. Therefore, in step S608, the recorder selection unit 110 determines, for each recorder 200, whether parallel recording is possible, based on the broadcast type combination information.

If it is determined that parallel recording is possible (step S608: possible), the processing returns to step S606. In step S606, the reservation ID is acquired for a reserved program having a recording start time after the reserved program is determined to be recordable in parallel, and the above described processing is performed. On the other hand, if it is determined that parallel recording is not possible (step S608: not possible), the processing moves to step S609. Note that if the nearest program for which reserved program recording is to be performed is the same broadcast type and the same channel as the program for immediate recording, it can be determined that parallel recording is possible since the reserved program recording can be executed as part of the immediate recording.

In step S609, the recorder selection unit 110 computes the storage capacity TCn required to execute immediate recording until the recording start of the reserved program determined not to be recordable in parallel, using the following equation (1). Note that "n" corresponds to the reference numerals of the recorders. TC1, for example, indicates the storage capacity of the recorder 200-1.

$$TCn = Ra\_1 \times (Ti\_Sn - Ti\_1) + \Sigma Ra\_Snm \times TRnm \quad (1)$$

Note that in equation 1, Ti_1 is the start time of immediate recording and Ra_1 is the recording rate. Ti_Sn is the start time information of a reserved program PSn in the recorder 200-*n* having the closest start time to the time Ti_1 while being determined not to be recordable in parallel. Ra_Snm is the recording rate and TRnm is the recording duration of a reserved program PPnm, prior to the reserved program PSn, that was determined to be recordable in parallel. Here, "n" corresponds to the reference numerals of the recorders, and "m" is a parameter for identifying reserved programs in a corresponding recorder 200-*n* that are determined to be recordable in parallel. For example, m is set to 1 for the closest reserved program to the time Ti_1. The summation is taken over all such values of m for the given value of n.

For example, consider the case where the recorder 200-1 has two parallel recordable reserved programs after time Ti_1, while a third reserved program is not recordable in parallel. In this case, equation (1) is represented as follows.

$$TC1 = Ra\_1 \times (Ti\_S1 - Ti\_1) + Ra\_S11 \times TR11 + Ra\_S12 \times TR12$$

Here, the third reserved program equates to PS1, and the start time of this program is Ti_S1. The first and second reserved programs are respectively PP11 and PP12, the recording rates are Ra_S11 and Ra_S12, and the recording durations are TR11 and TR12.

Note that step S609 is omitted in the case where there are no reserved programs in the corresponding recorder.

Next, in step S610, the recorder selection unit 110 compares the storage capacity TCn computed in S609 and the remaining storage capacity information CAn of the corresponding recorder 200-*n* acquired in step S604, and determines the available storage capacity RCn for which the recorder 200-*n* is able to perform immediate recording. For example, the storage capacity RC1 available for immediate recording by the recorder 200-1 is RC1=TC1 if TC1<CA1, and RC1=CA1 if TC1>CA1. Note that RCn=CAn uniformly for recorders that do not have recording reservations.

Next, in step S611, the recorder selection unit 110 determines whether the above processing has been performed for all of the recorders 200. If there are unprocessed recorders, the processing returns to step S602 and is repeated. On the other hand, if all of the recorders have been processed (step S611: YES), the processing moves to step S612.

In step S612, the recorder selection unit 110 compares the available storage capacities RC1 to RCn determined respectively for the recorders 200-1 to 200-*n*, and determines the largest storage capacity from RC1 to RCn. In step S613, the recorder selection unit 110 determines the recorder corresponding to the largest storage capacity determined in step S612 as the selected recorder, and the processing of FIG. 6 ends.

Note that in the above description, it is assumed that program recording reserved earlier is given priority over the program for immediate recording, and that if it is determined that parallel recording is not possible based on the broadcast type combination information, the immediate recording will be terminated prior to the start of the program reserved earlier. However, depending on the recorder, there may be a function for attaching priorities to the reserved programs. Therefore, the period for which immediate recording can be performed may be specified, with further consideration given to this priority information. For example, if priorities are settable over a plurality of levels, reserved program recording whose priority is set at or below a certain level can be removed from consideration. Also, if immediate recording ends up actually being performed by that recorder, the control unit 109 performs processing to cancel the recording reservation removed from consideration prior to the start time thereof.

Similarly, there recorders that automatically record broadcast programs which match keywords registered by the user may be used. Processing may be performed with programs reserved automatically also viewed as having a low priority.

According to the present embodiment, as described above, for performing immediate recording, the storage capacity available for immediate recording is determined after having taken into consideration recording reservations already made for each recorder. The recorder with the largest available storage capacity (which equates to the recorder capable of recording for the longest duration) can then be determined as the selected recorder. This enables the possibility of unrecorded content arising due to insufficient storage capacity in the recorder or due to the recording of the next reserved program to be further reduced.

Third Embodiment

The first and second embodiments do not take into consideration the storage capacity for reserved program recording to be executed after the immediate recording has ended. In contrast, the third embodiment is characterized in that, taking into consideration the storage capacity required to execute recording already reserved at the point at which the immediate recording is started, the recorder capable of performing immediate recording for the longest is determined as the selected recorder.

In this embodiment, the schematic configurations of the digital television receiver 100 and the recorders 200, and the configuration of the remote controller according to the present embodiment are the same as (or alternatively similar to) the first embodiment. The overview of the immediate recording process according to the present embodiment can be implemented in the manner described in the first embodiment as illustrated in FIG. 4 except for the following differences.

Figure 8:
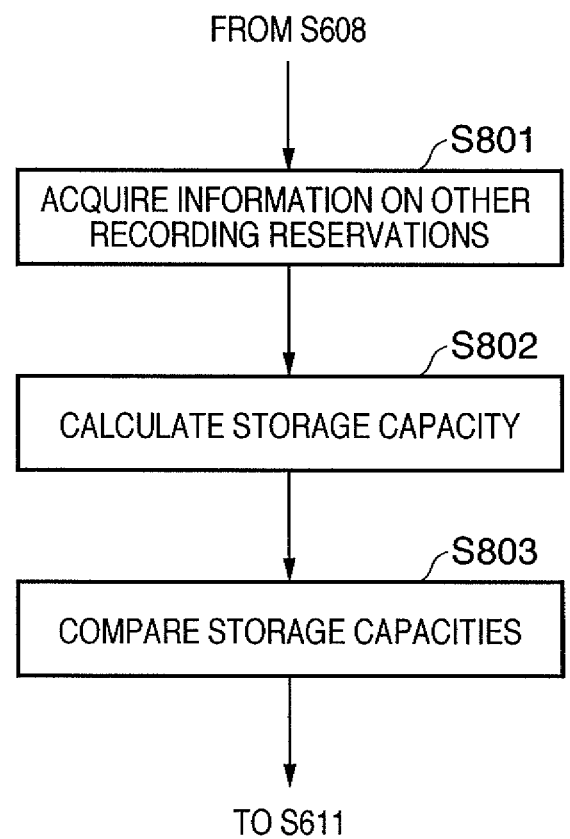
FIG. 8 is a flowchart illustrating partial content of a recorder selection process corresponding to a third embodiment of the invention.

The recorder selection process of step S402 in FIG. 4 executed in accordance with the present embodiment is described next in detail. While the recorder selection process of the present embodiment is substantially similar to the processing shown in FIG. 6 of the second embodiment. The differences from FIG. 6 lie in the substitution of part of the processing by the processing shown in FIG. 8. FIG. 8 is a flowchart showing the replacement for that part of the processing of FIG. 6 (namely steps S609 and S610) that gets replaced.

In FIG. 8, the processing from steps S801 to S803 is executed instead of steps S609 and S610 of FIG. 6, after determining in step S608 whether parallel recording is possible.

Firstly, in step S801, the recorder selection unit 110 acquires from the recorders 200 information related to all reserved recording after the reserved recording for which parallel recording was determined not to be possible. This information includes at least the recording rate and recording duration of the reserved recording.

Next, in step S802, the recorder selection unit 110 computes the storage capacity TCn required to execute immediate recording until the start of the reserved program recording determined not to be recordable in parallel, using the following equation (2).

$$TCn = Ra\_1 \times (Ti\_Sn - Ti\_1) \quad (2)$$

Further, the recorder selection unit 110 computes the storage capacity RAn required for the corresponding recorder 200-n to execute all reserved program recording already reserved at the present point in time (Ti_1), using the following equation (3).

$$RAn = \Sigma Ra\_Snm \times TRnm \quad (3)$$

The summation is taken over all values of m, where m is as described with respect to the second embodiment.

Note that the definitions of the parameters constituting equations (2) and (3) are the same as the corresponding parameters in the second embodiment. Further, the recorder selection unit 110 computes the storage capacity RSn usable in immediate recording out of the remaining storage capacity CAn of the recorder 200-n, based on the following equation (4).

$$RSn = CAn - RAn \quad (4)$$

In the following step, S803, the recorder selection unit 110 compares the storage capacity TCn computed in S802 and the storage capacity RSn usable in immediate recording, and determines the available storage capacity RCn for which the recorder 200-n is able to perform immediate recording. For example, the storage capacity RC1 available for immediate recording by the recorder 200-1 is RC1=TC1 if TC1<RS1, and RC1=RS1 if TC1>RS1. Note that RCn=CAn uniformly for recorders that do not have recording reservations.

The processing then returns to FIG. 6. In particular, the processing continues at step S611 of FIG. 6 and the corresponding processing described with respect to FIG. 6 is executed.

Note that in the above, the storage capacity required to execute all reserved program recording already set at the point at which immediate recording is instructed is calculated based on equation (3). However, depending on the recorder, there may be both an automatic recording reservation function for automatically reserving programs with a high preference, based on preference information of the user, and a manual recording reservation function based on manual operation by the user. Such a recorder may take into consideration only reserved program recording set using the manual recording reservation function, while removing from consideration reserved program recording set using the automatic recording reservation function.

If priorities are set for reserved programs, those to be considered and those to be removed from consideration may be determined in accordance with the priorities. The storage capacity RAn can be calculated with consideration given to reserved program recording assigned a certain priority or above.

As described above, the present embodiment enables the situation where execution of reserved program recording already set is interrupted by execution of immediate recording to be prevented.

Fourth Embodiment

Figure 9:
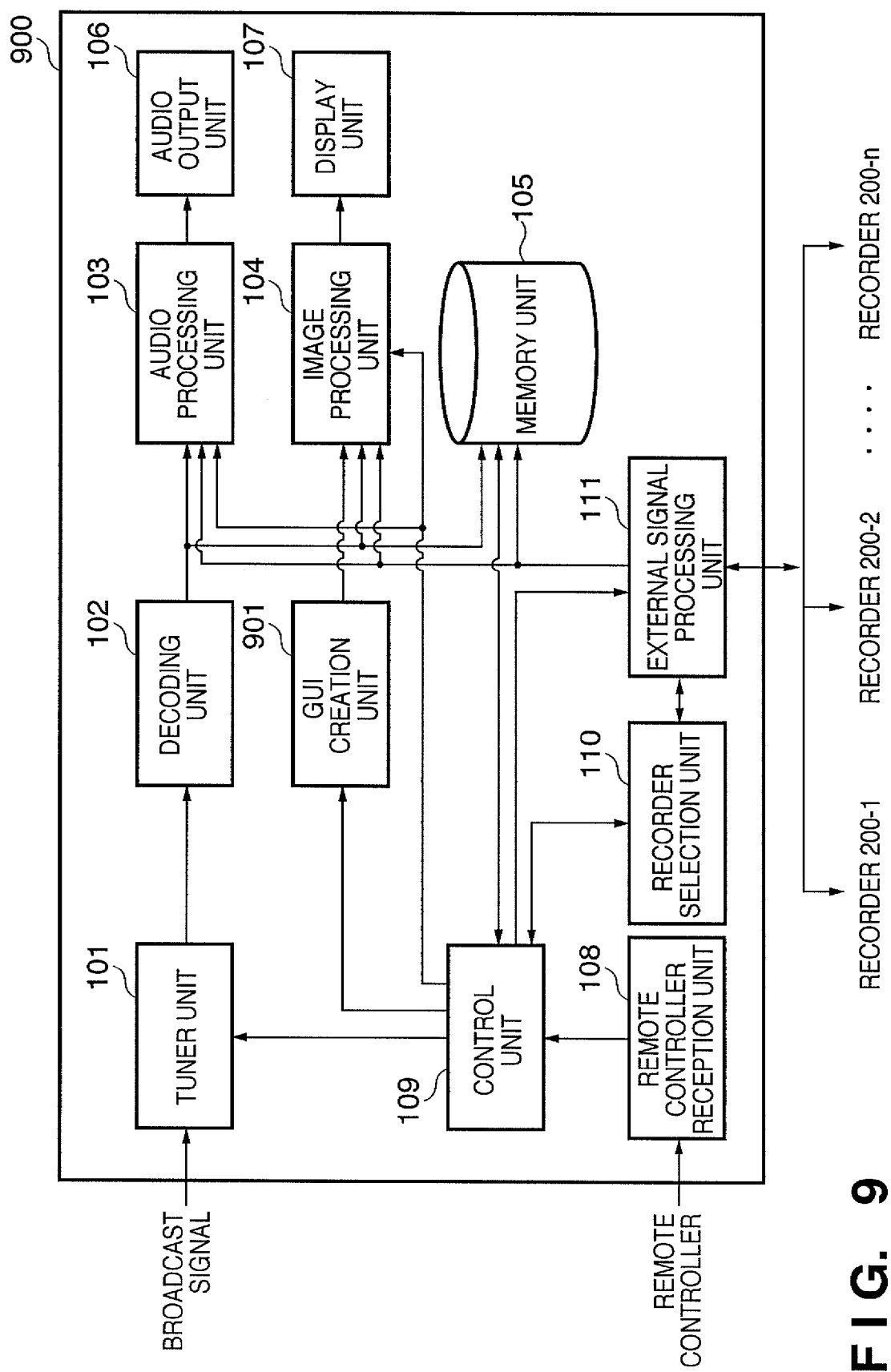
FIG. 9 shows an exemplary hardware configuration of a digital television receiver corresponding to a fourth embodiment of the invention.

Next, a fourth embodiment of the present invention will be described. FIG. 9 is a block diagram showing a schematic configuration of a digital television receiver 900 corresponding to the present embodiment. The digital television receiver 900 has a configuration in which a GUI creation unit 901 has been added to the digital television receiver 100 shown in FIG. 2A. Since like functions to the blocks of FIG. 2A are achieved, apart from the GUI creation unit 901, reference numerals corresponding to the reused blocks are included in FIG. 9.

The GUI creation unit 901 creates a GUI for displaying the recordable period on a screen, when immediate recording is started.

Figure 10:
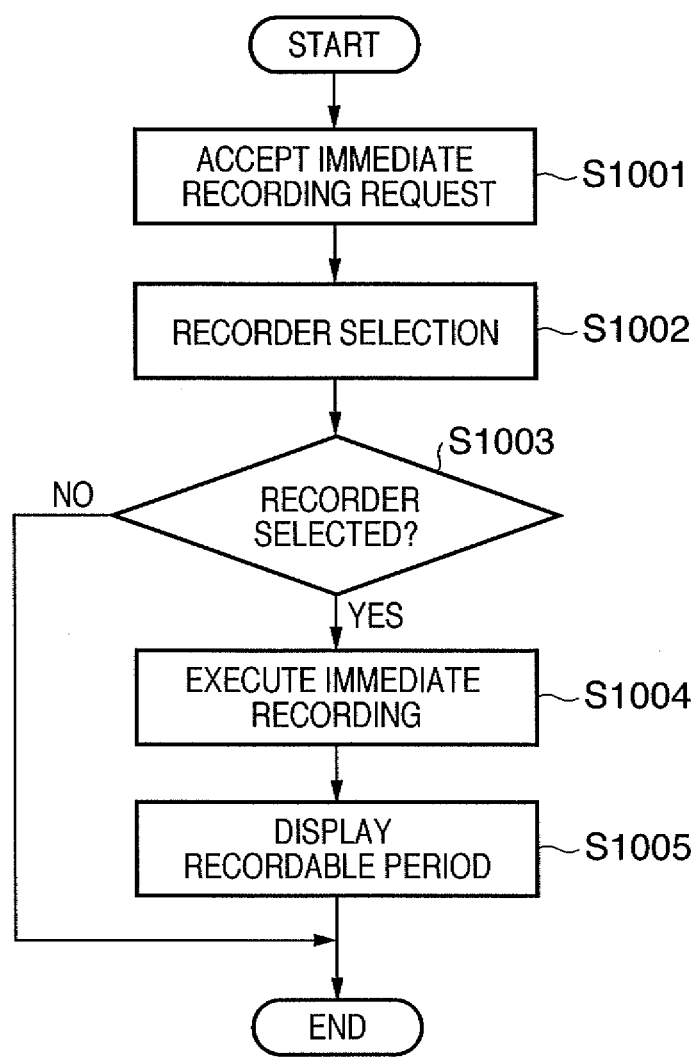
FIG. 10 is a flowchart showing an exemplary immediate recording process corresponding to the fourth embodiment of the invention.

Next, the immediate recording process corresponding to the present embodiment will be described with reference FIG. 10. FIG. 10 is a flowchart showing an exemplary immediate recording process according to the present embodiment. Note that processing in accordance with the flowchart shown in FIG. 10 is realized as a result of corresponding processing programs being executed by the blocks under the control of the control unit 109.

The processing from steps S1001 to S1004 in FIG. 10 corresponds respectively to the processing from steps S401 to S404 in FIG. 4.

In step S1004, the control unit 109 executes recording on the selected recorder, and then, in step S1005, requests the GUI creation unit 901 to display the immediately recordable period.

The GUI creation unit 901 acquires the recordable period from the control unit 109 or the recorder selection unit 110 in response to the request from the control unit 109, and creates GUI data. The created GUI data is passed to the image processing unit 104, and displayed on the display unit 107 after being combined with a moving image output from the decoding unit 102.

Figure 11:
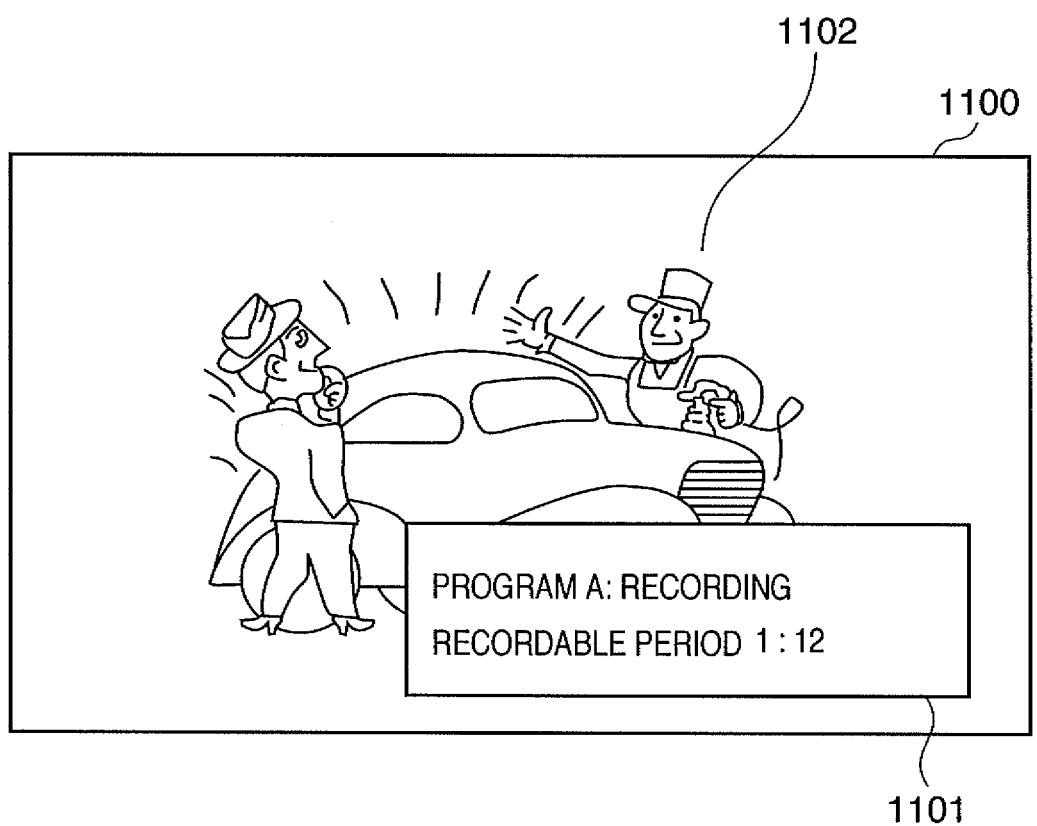
FIG. 11 shows an exemplary display screen corresponding to the fourth embodiment of the invention.

FIG. 11 shows an exemplary display screen having immediately recordable period information combined thereon. As shown here, a recordable period display area 1101 is combined on a moving image 1102 of the program being recorded on the screen 1100 and displayed. In terms of the display content, the current program title, recording state and the like may be displayed as shown in FIG. 11, in addition to the recordable period. Also, the recordable period may be counted down as recording proceeds. In this case, the GUI creation unit 901 acquires period information at a prescribed timing using a timer unit (not shown) in the digital television receiver 900, and updates the recordable period in the recordable period display area 1101.

As described above, the present embodiment enables the recordable period to be explicated to the user via the display unit 107, when immediate recording is performed in accordance with the first to third embodiments. This enables the user to readily perceive the timing at which recording will end and prevent the occurrence of unrecorded content.

According to the present invention corresponding to the first to fourth embodiments, the execution start time of reserved program recording in each recorder is taken into consideration in addition to the remaining storage capacity of the recorders, when the recorder control apparatus determines the recording destination. The recorder capable of securing the longest recording period if immediate recording were executed in the recorders can thus be specified.

Other Embodiments

Note that the present invention can be applied to an apparatus comprising a single device or to system comprising a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. Moreover a system or apparatus that has the functions of the software program can be implemented, such as a firm ware implementation for example. The mode of implementation need not rely upon a software program.

The functions of the present invention can be implemented by computer. Program code for implementing the functions of the present invention installed in a computer or other machine that can execute the program code also implements the present invention. Thus, the present invention includes computer programs for the purpose of implementing the functions of the present invention.

The software program may be executed in any form, such as an object code, a program executed by an interpreter, or script data supplied to an operating system.

Examples of storage media that can be used for supplying the software program are a floppy disk, a hard disk, an optical disk, a magneto-optical disk, a CD-ROM, a CD-R, a CD-RW, a magnetic tape, a non-volatile type memory card, a ROM, and a DVD (DVD-ROM, DVD-R or DVD-RW).

As for the method of supplying the program, a client computer can be connected to a website on the Internet using a browser of the client computer, and the computer program of the present invention or an automatically-installable compressed file of the program can be downloaded to a recording medium such as a hard disk. Further, a program for implementing the present invention can be supplied by dividing the program code constituting the program into a plurality of files and downloading the files from different websites. A WWW (World Wide Web) server that downloads, to multiple users, the program files that implement the functions of the present invention by computer is also covered by the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit may perform all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-065781, filed Mar. 14, 2007, which is hereby incorporated by reference herein in its entirety.

What is claimed is:

1. A recorder control apparatus which controls recording of a broadcast signal in a plurality of recorders connected to the recorder control apparatus, comprising:
a tuner that receives a broadcast signal of a predetermined channel;
a receiver that receives a request command to record the broadcast signal of the predetermined channel;
a controller that communicates with the plurality of recorders, acquires reservation information relating to a reserved program to be recorded by each recorder after the request command is accepted, selects a recorder capable of recording the broadcast signal of the predetermined channel for a longest duration based on the reservation information, and sends a control command to the selected recorder to record the broadcast signal of the predetermined channel; and
a display controller that causes a display unit to display recordable period information indicating recordable period for which the broadcast signal of the predetermined channel is recordable in a case where the selected recorder started recording in response to the control command sent by the controller,
wherein the controller acquires reservation information relating to a first reserved program, which is an earliest reserved program to be recorded, for each recorder of the plurality of recorders after the request command is accepted, and selects, from the plurality of recorders connected to the recorder control apparatus, a recorder having the latest recording start time of the first reserved program so that the selected recorder records the broadcast signal of the predetermined channel for a longest duration before the selected recorder starts to record the first reserved program of the selected recorder.

2. The recorder control apparatus according to claim 1, further comprising the display unit.

3. The recorder control apparatus according to claim 1, wherein the display controller causes the display unit to display program title information of the broadcast signal of the predetermined channel in a case where the selected recorder started recording in response to the control command sent by the controller.

4. The recorder control apparatus according to claim 1, wherein the plurality of recorders are connected to the recorder control apparatus by HDMI interface.

5. A control method of a recorder control apparatus which controls recording of a broadcast signal in a plurality of recorders connected to the recorder control apparatus and which is implemented by at least one computer program that is executed by a processor, the method comprising:

receiving a broadcast signal of a predetermined channel;

receiving a request command to record the broadcast signal of the predetermined channel;

communicating with the plurality of recorders;

acquiring reservation information relating to a reserved program to be recorded by each recorder after the request command is accepted;

selecting a recorder capable of recording the broadcast signal of the predetermined channel for a longest duration, based on the reservation information;

sending a control command to the selected recorder to record the broadcast signal of the predetermined channel; and displaying on a display apparatus recordable period information indicating recordable period for which the broadcast signal of the predetermined channel is recordable in a case where the selected recorder started recording in response to the control command, wherein acquiring reservation information includes acquiring reservation information relating to a first reserved program, which is an earliest reserved program to be recorded, for each recorder of the plurality of recorders after the request command is accepted, and selecting a recorder includes selecting, from the plurality of recorders connected to the recorder control apparatus, a recorder having the latest recording start time of the first reserved program so that the selected recorder records the broadcast signal of the predetermined channel for a longest duration before the selected recorder starts to record the first reserved program of the selected recorder.

6. The control method according to claim 5, further comprising displaying program title information of the broadcast signal of the predetermined channel in a case where the selected recorder started recording in response to the control command.

7. The control method according to claim 5, wherein the plurality of recorders are connected to the recorder control apparatus by HDMI interface.

* * * * *